United States Patent
Wu et al.

(10) Patent No.: US 6,435,343 B1
(45) Date of Patent: Aug. 20, 2002

(54) DISK MAGAZINE FOR ACCESSING CD DISKS

(75) Inventors: Jyh-Ming Wu; Yu-Pan Pai; Huan-Chang Lin, all of Hsin Chu (TW)

(73) Assignee: Ritek Corporation (TW)

( * ) Notice: Subject to any disclaimer, the term of this patent is extended or adjusted under 35 U.S.C. 154(b) by 0 days.

(21) Appl. No.: 09/685,979

(22) Filed: Oct. 10, 2000

(51) Int. Cl.[7] ............................................. B65D 85/57
(52) U.S. Cl. ..................... 206/308.1; 206/493; 206/303
(58) Field of Search ............................... 206/307, 308.1, 206/309, 303, 493; 369/192, 75.1; 414/796.7, 796.8, 796.9, 908

(56) References Cited

U.S. PATENT DOCUMENTS

| | | | | |
|---|---|---|---|---|
| 4,316,281 A | * | 2/1982 | Prusak | 206/309 |
| 4,516,678 A | * | 5/1985 | Fotiadis et al. | 206/309 |
| 4,700,839 A | * | 10/1987 | Fujii | 206/303 |
| 4,955,471 A | * | 9/1990 | Hirose et al. | 206/303 |
| 5,501,325 A | * | 3/1996 | Mehltretter | 206/303 |
| 5,588,525 A | * | 12/1996 | Rosler | 206/303 |
| 5,613,745 A | * | 3/1997 | Cho et al. | 312/9.9 |
| 5,692,878 A | * | 12/1997 | Freund | 414/796.6 |
| 5,718,559 A | * | 2/1998 | Freund | 414/797 |
| 6,138,824 A | * | 10/2000 | Hyakusoku et al. | 206/307 |

* cited by examiner

Primary Examiner—Shian Luong
(74) Attorney, Agent, or Firm—Martine & Penilla, LLP

(57) ABSTRACT

A disk magazine for accessing Compact Disks includes a bottom stage, a vertical shaft fixed and supported at the bottom stage, a prop-up piece being loaded with Compact Disks and having an opening through which the vertical shaft extends, a barrel tightly combined with the bottom stage at the lower end, and a lid tightly covering up the upper side of the bottom stage. The lid is provided with a fixing hole into which the tapering tip pole of the vertical shaft inserts, and two O-rings are used for sealing between the lid and barrel, as well as between the bottom stage and barrel respectively to prevent the disk magazine from the environmental contamination.

4 Claims, 5 Drawing Sheets

DISK MAGAZINE FOR ACCESSING CD DISKS

BACKGROUND OF THE INVENTION

A. Field of the Invention

The present invention relates to a disk magazine, particularly to a disk magazine for accessing Compact Disks protected from the particle contamination and environmental vibration during the manufacturing process of Compact Disks.

B. Description of the Related Art

In the conventional manufacturing process of Compact Disks like CD-ROM, DVD, and so on, there is no need for a sealed container for transporting between processes. A specially designed disk magazine is unnecessary for manufacturing the normal-density Compact Disk (hereafter referred to as CD) in different processes because the tolerance to particle contamination is not so critical, but it is not the case as the high density, mega speed, and mini-sized CD tends to be the future product. The particle contamination during the conveying of CDs in processes becomes a key issue for the yield improvement, and the inevitable vibration due to transportation between the front-end and back-end manufacturing modules can also cause damage of CDs. Besides, a conventional packing procedure of the processed CDs for the transportation between the front-end and back-end processes is unnecessary by using a specific disk magazine, thereby realizing large cost down.

As shown in FIG. 1, a conventional magazine 10 for accessing disk-like information media generally includes a stack container 32, a lifting mechanism 35, and a gripping mechanism 34. The stack container 32 usually includes a vertical shaft 322 which passes through the openings of stacked CDs; the stacked CDs are lifted up by the lifting mechanism 35 to a certain position of the stack container 32, then a topmost CD is displaced in a horizontal direction against the shaft 322 by a displacement means 33 such that the CD is removed by the gripping mechanism 34 for the following processing. In addition, a sensor mechanism 36 is disposed in the upper part of the magazine 10 for detecting that a topmost CD on the stack container 32 has been lifted by the lifting mechanism 35 to a removal position.

However, this kind of the conventional disk magazine is not specially designed for the production in a high-level clean room because of its poor isolation from the outer environment in view of the particle contamination. Besides, the conventional magazine is very complex in the sense that the whole magazine structure includes at least the stack container, the lifting mechanism and the gripping mechanism as a whole, thus such relatively complicated structure causes operation and maintenance problems which increase the manufacturing cost.

SUMMARY OF THE INVENTION

One of the objects of the invention is to provide a disk magazine for accessing CDs during manufacturing processes of CDs. The disk magazine includes a bottom stage, a vertical shaft fixed and supported at the bottom stage, a prop-up piece being arranged above the bottom stage and having an opening through which the vertical shaft extends, a barrel tightly combined with the bottom stage at the lower end, and a lid tightly covering up the upper side of the bottom stage.

According to the invention, the lid is preferably provided with a fixing hole into which the vertical shaft is inserted so that the vertical shaft is secured when the lid is combined with the barrel. Besides, two O-rings are used for sealing between the lid and the barrel, as well as between the bottom stage and the barrel respectively to prevent the disk magazine from the environmental contamination.

The CDs stored in such disk magazine are protected from particle contamination and vibrational damage during transportation of processing, and the disk magazine compared with the conventional magazine has the advantages of low cost and portability.

BRIEF DESCRIPTION OF THE DRAWINGS

These and other objects and advantages of the present invention will become apparent by reference to the following description and accompanying drawings wherein.

DETAIL DESCRIPTION OF THE INVENTION

The invention can be fully understood by the following detailed description of the preferred embodiments referring to the figures. The disk magazine of the invention is adequate for use of manufacturing all kinds of disk-like media such as CD-ROM, DVD and so on.

Figure 1:
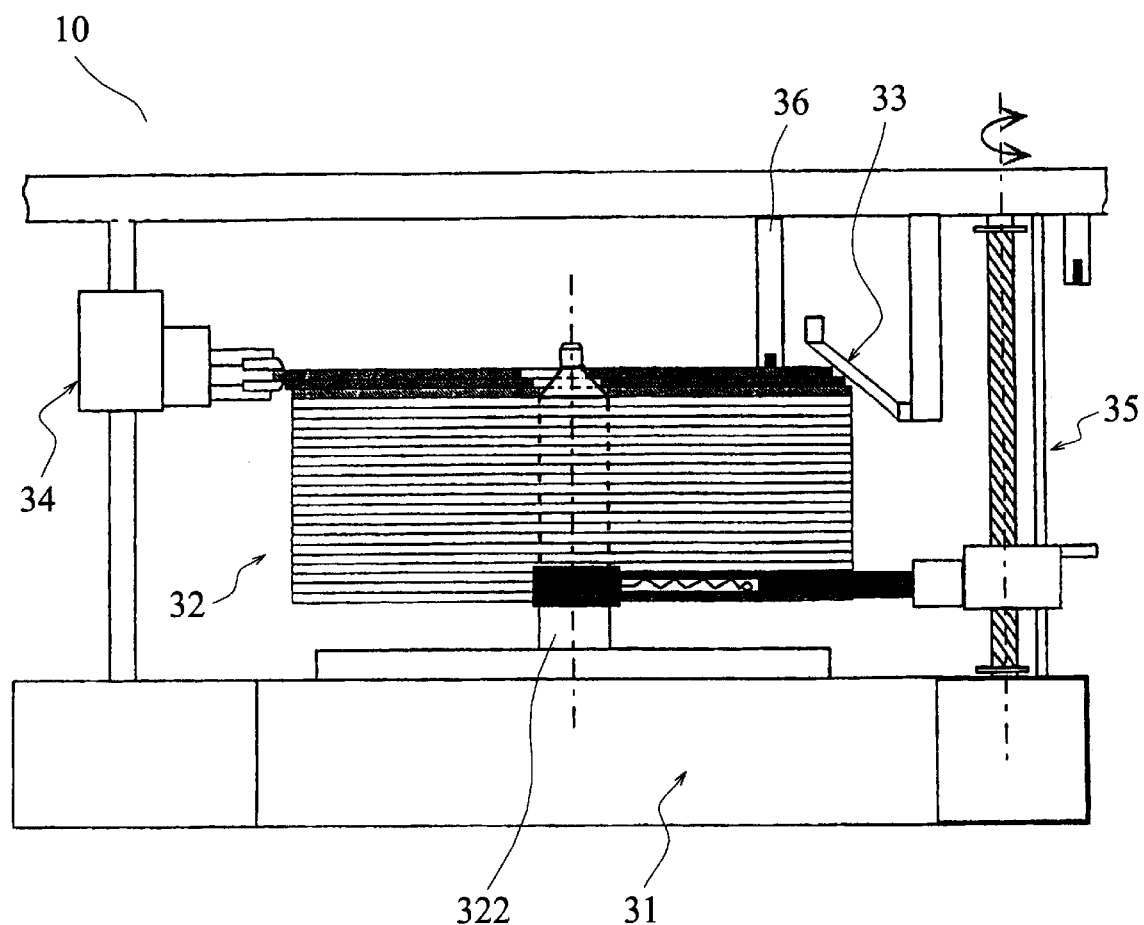
FIG. 1 illustrates a pictorial view of a conventional disk magazine.
Figure 2:
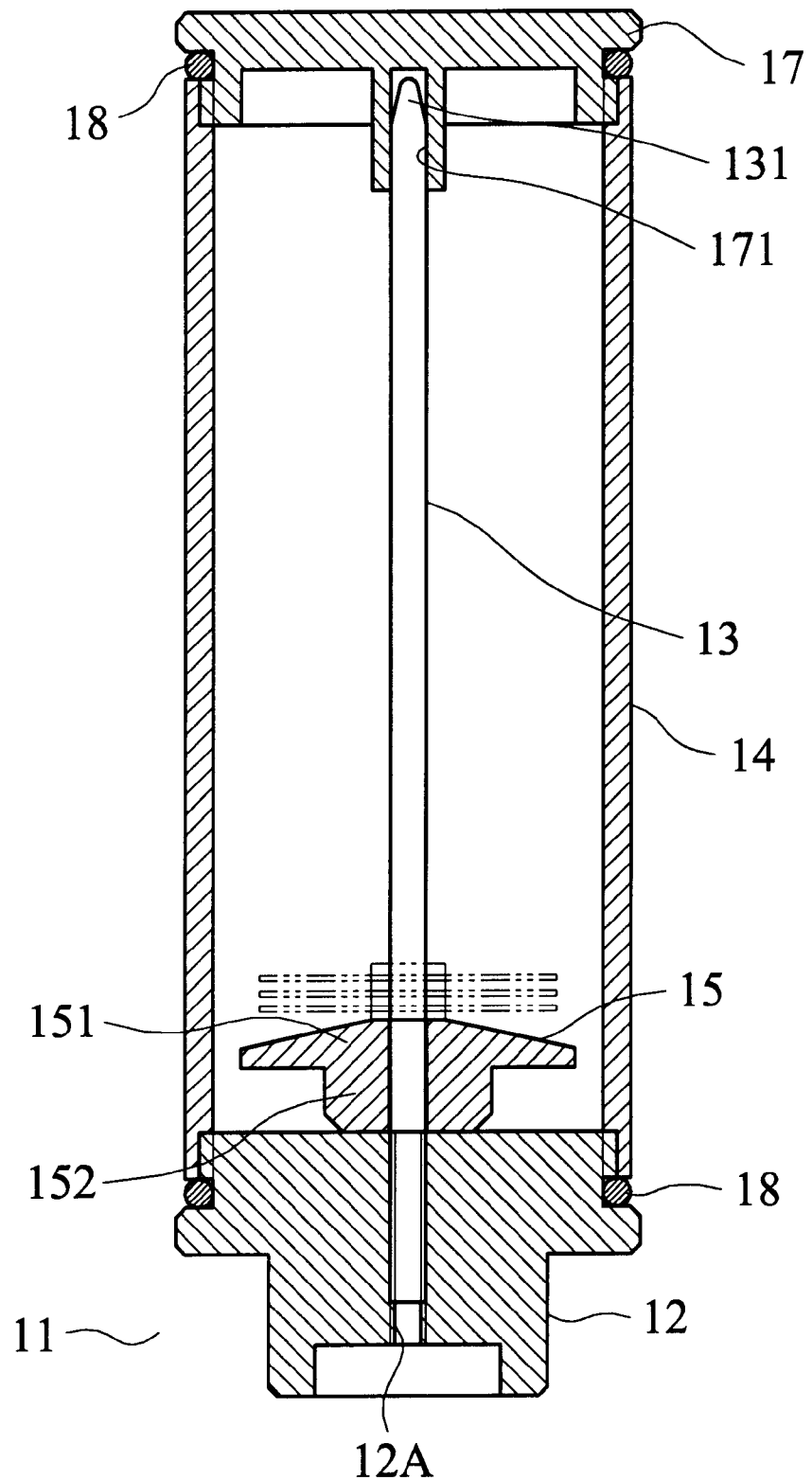
FIG. 2 illustrates a cross-sectional view of the disk magazine according to the first embodiment of the present invention.

Referring to FIG. 2, a disk magazine 11 of the first embodiment of the invention includes a bottom stage 12, a vertical shaft 13 preferably fixed at the center of the bottom stage 12 at one end, a prop-up piece 15 having an opening through which the vertical shaft 13 extends, a barrel 14 tightly combined with the bottom stage 12, and a lid 17 tightly combined with the barrel 14.

The tip pole 131 of the vertical shaft 13 has a tapering shape so that it is inserted easily into the openings of CDs, and the bottom end of the vertical shaft 13 is fixed by a screw hole 12A at the center of the bottom stage 12. The barrel 14 is threaded at the bottom side for combining with the bottom stage 12, and at the top side is for combining with the lid 17.

The prop-up piece 15 includes a first portion 151 and a second portion 152 which are integrally formed in a mushroom-like shape. The prop-up piece 15 is provided with a through hole through which the vertical shaft 13 passes such that the prop-up piece 15 is moved up and down along the vertical shaft 13. As the top side of the barrel 14 is covered up by the lid 17, the tip pole 131 is simultaneously inserted into the fixing hole 171 such that the vertical shaft 13 is ensured to be kept vertical as it should be and the vibration of the vertical shaft 13 during transportation is lowered to the minimal level. Besides, two O-rings 18 are used for sealing between the lid 17 and barrel 14, as well as between the bottom stage 12 and barrel 14 so that the particle contamination of the environment is minimized in the standard of the clean room.

Figure 3:
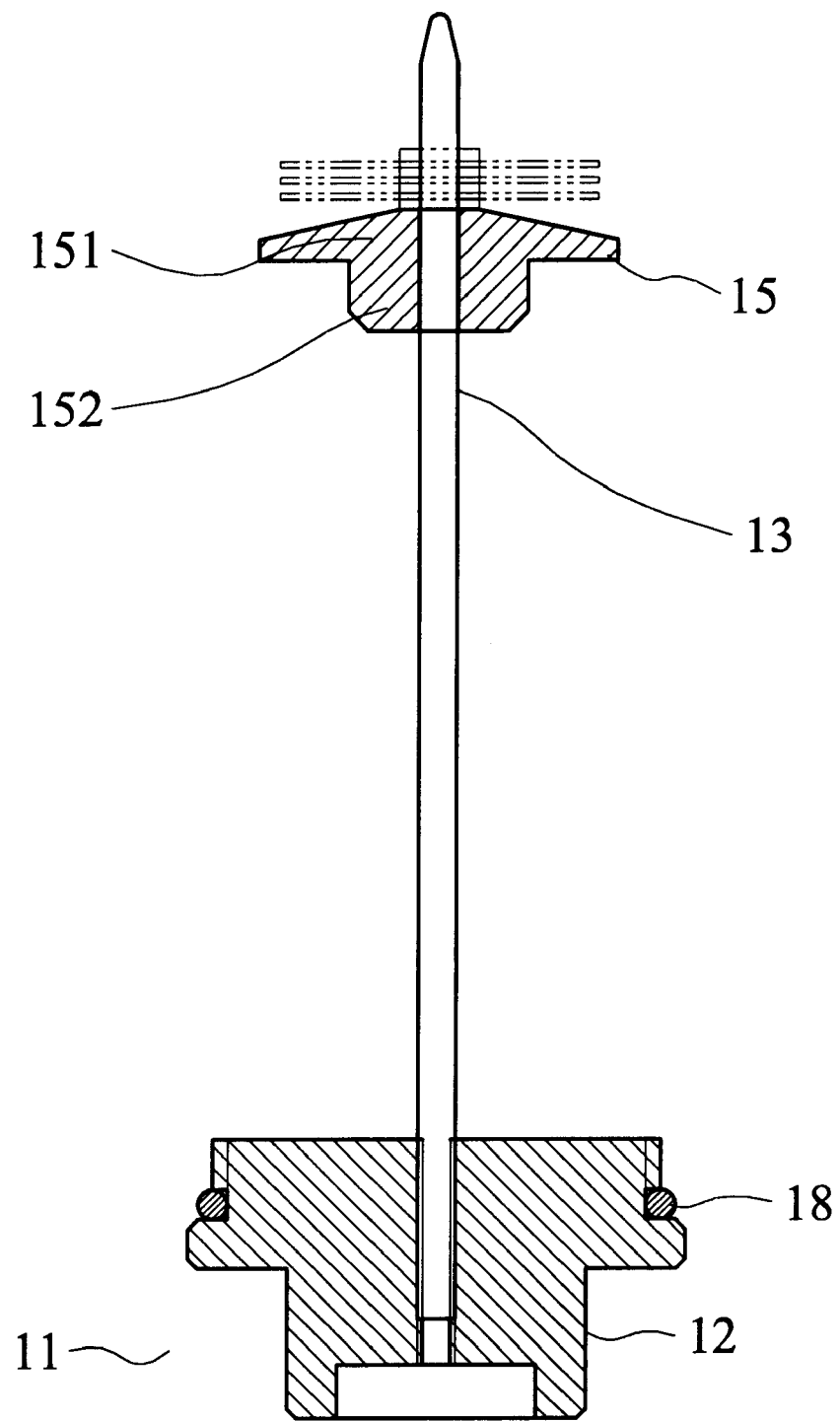
FIG. 3 illustrates a cross-sectional view of the disk magazine where the prop-up piece is lifted up according to the first embodiment of the present invention.

As shown in FIG. 3, the barrel 14 and the lid 17 are separated from the disk magazine 11 in advance after the disk magazine 11 is positioned. When a CD is ready to be put into the disk magazine 11, a pair of mechanical arms (not shown) controlled by a lifting mechanism (not shown) pass through the space under the first portion 151 and beside the second portion 152 such that the prop-up piece 15 is lifted upwards by the mechanical arms; then a gripping mechanism (not shown) grabs a CD and put it over the prop-up piece 15. A sensing mechanism (not shown) detects the position of the color 15 with respect to a X-Y table (not shown) and calculates the number of CDs inside the disk magazine 11; further, a signal responsive to detection of the sensoring mechanism is generated to control the real-time adjustment of the lifting mechanism such that prop-up piece 15 is lowered incrementally by the lifting mechanism after one CD is laid over the prop-up piece 15. Once the prop-up piece 15 is loaded with enough number of CDs, the barrel 14 is tightly covered up by the lid 17 with the tip pole 131 being simultaneously inserted into the fixing hole 171, which completes a storing procedure of the disk magazine 11.

To remove CDs from the disk magazine 11, a similar process is followed. The prop-up piece 15 is lifted up along the vertical shaft 13 by the mechanical arms passing through the space under the first portion 151 and beside the second portion 152; then each CD is removed and transported by the gripping mechanism for the following manufacturing process. During this gripping process, the sensoring mechanism can detect the position of the topmost CD over the prop-up piece 15 such that the topmost CD is always kept at a predetermined position along the vertical shaft 13.

CDs stored in the disk magazine 11 are well protected from damage which possibly occurs in transportation. To improve the strength, the vertical shaft 13 is made of thermally treated material such as stainless steel, tungsten carbide, high speed steel, carbon fiber, and so on.

Figure 4:
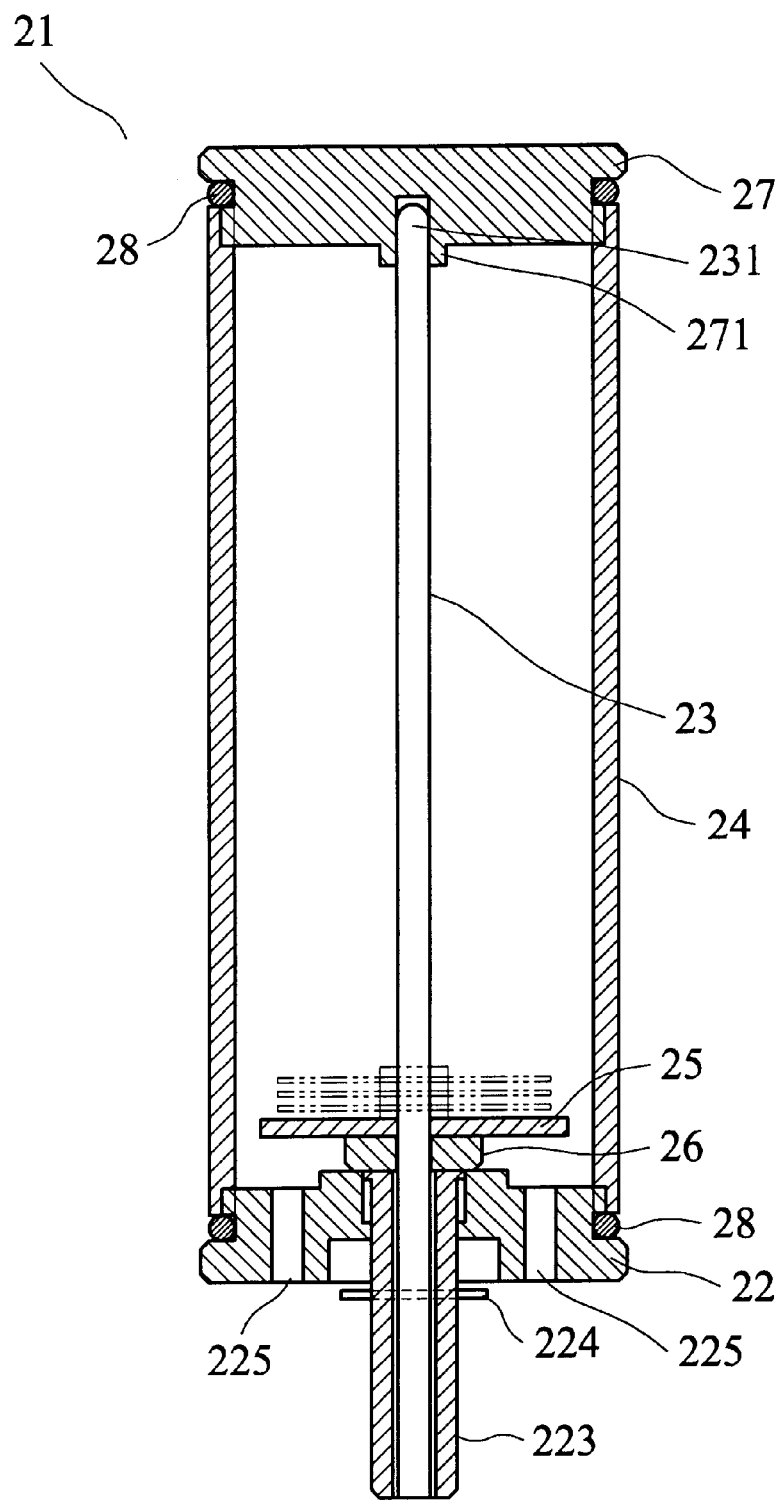
FIG. 4 illustrates a cross-sectional view of the disk magazine according to the second embodiment of the present invention.

Referring to FIG. 4, a disk magazine 21 according to the second embodiment of the invention includes a bottom stage 22, a vertical shaft 23 being fixed at the center of the bottom stage 22 at one end and extending upward, a prop-up piece 25 having an opening through which the vertical shaft 23 extends, a barrel 24 tightly combined with the bottom stage 22 at the bottom side, and a lid 27 tightly combined with the barrel 24.

The tip pole 231 of the vertical shaft 23 has a tapering shape so that it is inserted easily into the openings of CDs. The barrel 24 is preferably threaded at the bottom side for being combined with the bottom stage 22, and at the top side for being combined with the lid 27. At the central portion of the bottom stage 22 is arranged a hollow sheath 223 through which the vertical shaft 23 moves up and down. Both the vertical shaft 23 and sheath 223 are provided with a through hole so that the vertical shaft 23 is fastened by a pin 224 passing through these two through holes simultaneously. The prop-up piece 25 is shaped into a circular plate and a supporting component 26 is used to support the prop-up piece 25 at the lowest position. Three pushing shafts 302 are installed at a control table 30 such that the prop-up piece 25 is elevated by controlling the pushing shafts 302 that passes through the respective through holes 225 of the bottom stage 22. A fixing hole 271 of the lid 27 is also arranged to secure the vertical shaft 23 when the barrel 24 is covered up with the lid 27.

Figure 5:
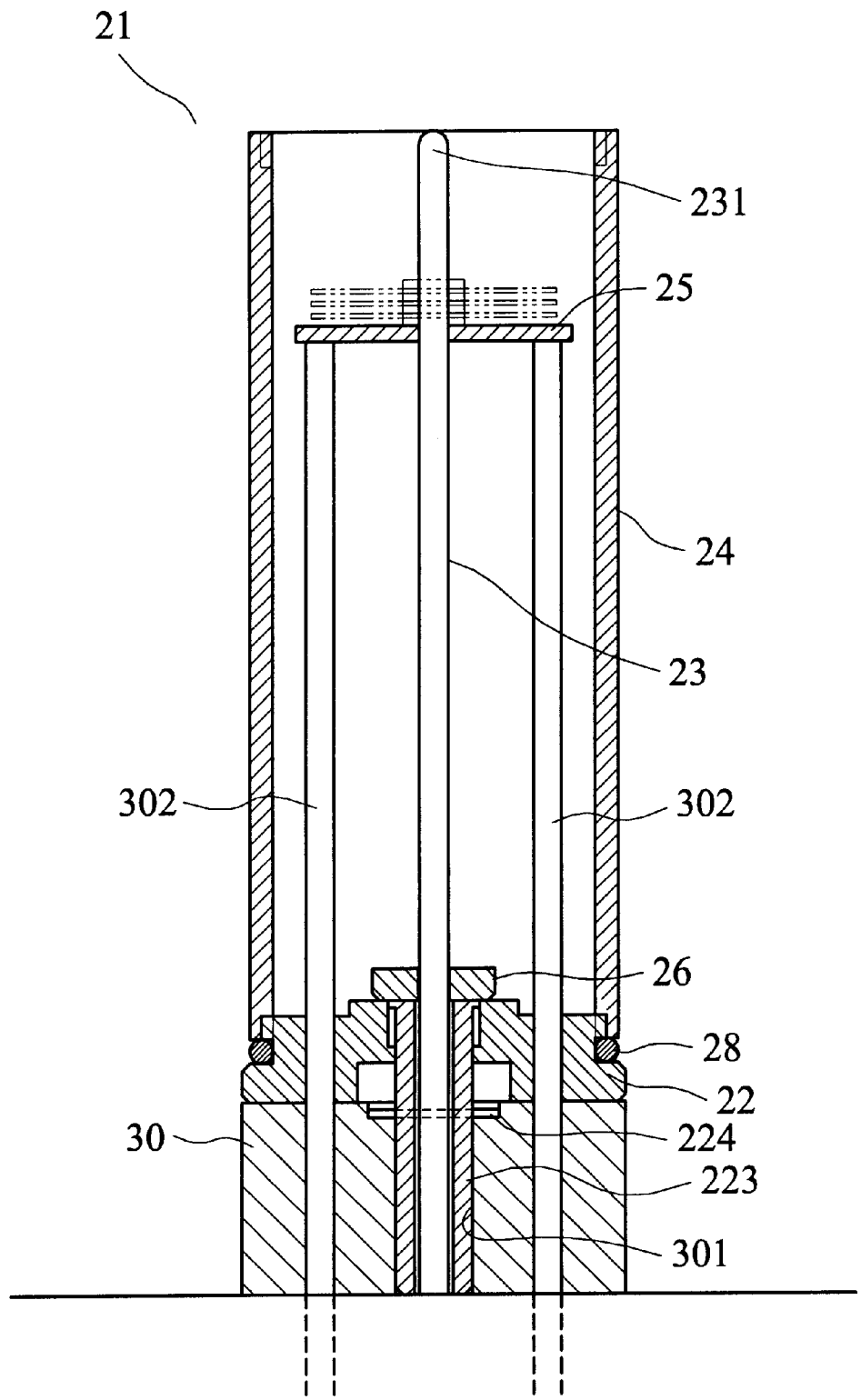
FIG. 5 illustrates a cross-sectional view of the disk magazine where the prop-up piece is lifted up by the pushing shafts according to the second embodiment of the present invention.

As shown in FIG. 5, the lid 27 is separated from the disk magazine 21 in advance. The sheath 223 with the pin 224 is inserted into a receiving hole 301 at the control table 30 such that the disk magazine 21 is further secured to the control table 30 by a spring device (not shown) and the through holes 225 are aligned to the respective pushing shafts 302. Next, the pushing shafts 302 elevated by an actuating device (not shown) passes through the through holes 225 and pushes the prop-up piece 25 up to a predetermined top position along the vertical shaft 23. Then A topmost CD in the disk magazine 21 is removed by a gripping mechanism (not shown) for following manufacturing processes, or CDs are placed into the disk magazine 21 and stored in stack by the gripping mechanism. During the above gripping processes, the pushing shafts 302 are controlled to correspondingly move up and down such that the topmost CD is always kept at a predetermined position along the vertical shaft 23.

Once the disk magazine 21 is loaded with enough number of CDs, the pushing shafts 302 are contracted into the control table 30, and the vertical shaft 23 temporarily fixed at the center of the station 30 is further separated from the disk magazine 21 by mechanical arms or directly by the operator. A cup (not shown) is capped onto the bottom of the bottom stage 22 in case particles contaminate the disk magazine 21 via the through holes 225.

By use of the aforementioned structures, the disk magazine of the invention advantages for its low cost and excellent portability, and it protects CDs from the environmental contamination and damage during transportation.

While this invention has been described with reference to an illustrative embodiment, it is not intended that this description is construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A disk magazine for accessing CDs (Compact Disks), comprising:
    a bottom stage;
    a vertical shaft fixed and supported at said bottom stage;
    a prop-up piece, including,
        a first portion;
        a second portion, wherein said first portion and said second portion are integrally formed with space under said first portion and beside said second portion; and
        a through hole penetrated through said first portion and said second portion for enabling said prop-up piece to move along said vertical shaft;
    a barrel being tightly combined with said bottom stage at the lower end and enclosing said prop-up piece, wherein the CDs are loaded over said prop-up piece; and
    it a lid tightly covering up the upper side of said barrel.

2. The disk magazine as claimed in claim 1, wherein said prop-up piece is substantially formed in a mushroom shape.

3. The disk magazine as claimed in claim, 1, wherein said lid is provided with a fixing hole into which said vertical shaft is inserted.

4. The disk magazine as claimed in claim 1, wherein at least two O-rings are used for sealing between said lid and barrel, as well as between said bottom stage and barrel, respectively.

* * * * *